(12) United States Patent
Yan et al.

(10) Patent No.: US 11,918,972 B2
(45) Date of Patent: Mar. 5, 2024

(54) POROUS CALCIUM SILICATE HYDRATE, PREPARATION METHOD THEREOF AND ADSORBENT

(71) Applicant: DeCarbon Technology (Shenzhen) Co., Ltd., Guangdong (CN)

(72) Inventors: Feng Yan, Guangdong (CN); Fan Qu, Guangdong (CN); Zuotai Zhang, Guangdong (CN); Chunyan Li, Guangdong (CN); Xuehua Shen, Guangdong (CN); Heijin Chen, Guangdong (CN)

(73) Assignee: DECARBON TECHNOLOGY (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 18/136,193

(22) Filed: Apr. 18, 2023

(65) Prior Publication Data

US 2023/0278005 A1    Sep. 7, 2023

Related U.S. Application Data

(63) Continuation of application No. PCT/CN2022/092655, filed on May 13, 2022.

(30) Foreign Application Priority Data

Mar. 2, 2022 (CN) .......................... 202210194894.7

(51) Int. Cl.
*B01J 20/10* (2006.01)
*B01D 53/02* (2006.01)
(Continued)

(52) U.S. Cl.
CPC .............. *B01J 20/10* (2013.01); *B01D 53/02* (2013.01); *B01J 20/22* (2013.01);
(Continued)

(58) Field of Classification Search
None
See application file for complete search history.

(56) References Cited

U.S. PATENT DOCUMENTS

| 4,279,873 | A | * | 7/1981 | Felsvang | .............. | B01D 53/501 |
| | | | | | | 423/243.08 |
| 11,214,525 | B2 | * | 1/2022 | Al-Rashed | .............. | C04B 24/06 |
| 2021/0040002 | A1 | * | 2/2021 | Al-Rashed | .............. | C04B 28/04 |
| 2022/0127199 | A1 | * | 4/2022 | Al-Rashed | .............. | C04B 24/06 |

FOREIGN PATENT DOCUMENTS

| CN | 101837982 A | 9/2010 |
| CN | 105502446 A | 4/2016 |

(Continued)

OTHER PUBLICATIONS

Chinese OA dated Apr. 13, 2022 issued in CN 202210194894.7.

(Continued)

*Primary Examiner* — Joseph D Anthony
(74) *Attorney, Agent, or Firm* — Scully, Scott, Murphy & Presser, P.C.

(57) ABSTRACT

A porous calcium silicate hydrate, a preparation method thereof and an adsorbent are provided. The preparation method of the porous calcium silicate hydrate includes: leaching fly ash with an alkali agent to obtain a silicate leaching solution; adding the silicate leaching solution dropwise to a calcium hydroxide suspension at a constant rate, and conducting stirring and a heating reaction to obtain a calcium silicate hydrate gel; and mixing the calcium silicate hydrate gel with an organic alcohol solvent, conducting azeotropic distillation, and then conducting separation, drying and calcination to obtain the porous calcium silicate hydrate.

12 Claims, 3 Drawing Sheets

(51) Int. Cl.
  *B01J 20/22* (2006.01)
  *B01J 20/28* (2006.01)
  *B01J 20/30* (2006.01)
  *C01B 33/24* (2006.01)
  *C02F 1/28* (2023.01)
  *C02F 101/20* (2006.01)

(52) U.S. Cl.
  CPC ... *B01J 20/28061* (2013.01); *B01J 20/28083* (2013.01); *B01J 20/3064* (2013.01); *B01J 20/3071* (2013.01); *B01J 20/3085* (2013.01); *C01B 33/24* (2013.01); *C02F 1/285* (2013.01); *B01D 2253/20* (2013.01); *B01D 2257/504* (2013.01); *C01P 2002/72* (2013.01); *C01P 2004/03* (2013.01); *C01P 2006/12* (2013.01); *C01P 2006/16* (2013.01); *C02F 2101/20* (2013.01)

(56) References Cited

FOREIGN PATENT DOCUMENTS

| CN | 106395838 A | 2/2017 |
| CN | 110813264 A | 2/2020 |
| CN | 113398875 A | 9/2021 |

OTHER PUBLICATIONS

Liu, Yongjun et al., "The Research Progress of Solid Amine CO2 Adsorbent Prepared by Amine-modified Porous Materials", Sichuan Chemical Industry (2014), ISSN 1672-4887, vol. 17, No. 05, pp. 25-28.

Liu, Shijie et al., Preparation of Hydrated Calcium Silicate Gel and its Adsorption Properties for Cu (II), Materials Science Forum (May 22, 2020), ISSN: 1662-9752, vol. 993, pp. 1445-1449.

\* cited by examiner

POROUS CALCIUM SILICATE HYDRATE, PREPARATION METHOD THEREOF AND ADSORBENT

CROSS-REFERENCE TO RELATED APPLICATIONS

The application is a continuation of International Application No. PCT/CN2022/092655, filed on May 13, 2022, which claims priority to Chinese Patent Application No. 202210194894.7, filed on Mar. 2, 2022, the entire disclosures of each of which are incorporated herein by reference for all purposes. No new matter has been introduced.

FIELD

The present application relates to the field of resource utilization of industrial solid wastes, and in particular to a porous calcium silicate hydrate, a preparation method thereof and an adsorbent.

BACKGROUND

A calcium silicate hydrate is a porous material, and has been widely used in various fields. At present, an expensive template agent is usually required to add for adjusting a pore structure of the calcium silicate hydrate when the calcium silicate hydrate is prepared, resulting in high preparation cost. In addition, the calcium silicate hydrate prepared by adding the template agent for adjustment has some bottlenecks in pore size and volume, which are difficult to increase greatly, so that application of the calcium silicate hydrate is greatly limited, and industrial application and popularization are also difficult.

SUMMARY

The present application provides a porous calcium silicate hydrate, a preparation method thereof and an adsorbent, so as to solve the problems that existing preparation methods of calcium silicate hydrates have high cost, the pore size and volume of the calcium silicate hydrates prepared are difficult to increase greatly and industrial application is limited.

In a first aspect, the present application provides a preparation method of a porous calcium silicate hydrate. The preparation method includes the following steps:

leaching: leaching fly ash with an alkali agent to obtain a silicate leaching solution;

reaction: adding the silicate leaching solution dropwise to a calcium hydroxide suspension at a constant rate, and conducting stirring and a heating reaction to obtain a calcium silicate hydrate gel; and pore expanding: mixing the calcium silicate hydrate gel with an organic alcohol solvent, conducting azeotropic distillation, and then conducting separation, drying and calcination to obtain the porous calcium silicate hydrate.

Further, in the step of leaching, the alkali agent is a sodium hydroxide aqueous solution, the sodium hydroxide aqueous solution and the fly ash are mixed and heated to undergo a hydrothermal reaction, followed by filtration and separation to obtain the silicate leaching solution and desilicified fly ash, the silicate leaching solution is a sodium silicate leaching solution, and the desilicified fly ash is used for recycling alumina.

Further, in the step of leaching, the alkali agent is a sodium hydroxide aqueous solution, the mass ratio of sodium hydroxide in the sodium hydroxide aqueous solution to the fly ash is 0.4:1 to 0.8:1, the sodium hydroxide aqueous solution has a concentration of 10-30 wt %, and the hydrothermal reaction is carried out at 105-115° C. for 0.4-0.6 h.

Further, the alkali agent is a sodium hydroxide aqueous solution; and in the step of reaction, stirring and a heating reaction are conducted, followed by filtration to obtain the calcium silicate hydrate gel and a sodium hydroxide byproduct, and the sodium hydroxide byproduct is used for recycling as the alkali agent.

Further, in the step of reaction, the molar ratio of a silicate in the silicate leaching solution to calcium hydroxide in the calcium hydroxide suspension is 0.9:1 to 1.1:1, and the silicate leaching solution has a concentration of 0.067-1.067 mol/L.

The silicate leaching solution is added dropwise to the calcium hydroxide suspension at a constant dropping rate of 15-35 mL/h, the stirring is conducted at a rate of 450-550 rpm, and the heating reaction is carried out at a temperature of 25-80° C. for 2-12 h.

Further, in the step of pore expanding, the organic alcohol solvent is at least one of ethanol, propanol or butanol, and the ratio of the mass of the calcium silicate hydrate gel to the volume of the organic alcohol solvent is 0.9 g: 15 mL to 1.1 g: 15 mL.

Further, in the step of pore expanding, the azeotropic distillation includes heating the calcium silicate hydrate gel and the organic alcohol solvent to a first temperature first, followed by distillation at constant temperature for 15-25 min, and then heating the same to a second temperature, followed by distillation at constant temperature for 35-45 min, where the first temperature is a boiling point temperature of a system formed by the organic alcohol solvent and water, and the second temperature is a boiling point temperature of the organic alcohol solvent;

and the drying is conducted at 80-85° C. for 10-14 h, and the calcination is conducted at 400-600° C. for 4-4.5 h.

In a second aspect, an embodiment of the present application provides a porous calcium silicate hydrate. The porous calcium silicate hydrate is prepared by the preparation method as described in the first aspect.

Further, the porous calcium silicate hydrate has a specific surface area of equal to or greater than 400 m2/g, a pore volume of equal to or greater than 2.7 cm3/g, and a pore size of 20-40 nm.

In a third aspect, the present application provides an adsorbent. The adsorbent includes a support and an organic amine active component loaded on the support. The support is a porous calcium silicate hydrate prepared by the preparation method as described in the first aspect. The adsorbent is used for capturing carbon dioxide and/or adsorbing heavy metals in wastewater.

Compared with the prior art, the present application has the following beneficial effects.

According to the preparation method provided in an embodiment of the present application, a porous calcium silicate hydrate with larger pore volume and a better pore structure can be obtained without the use of a template agent, so that the porous calcium silicate hydrate can be used as a support of an adsorbent and has excellent adsorption properties when used in an adsorbent. Moreover, the preparation method in an embodiment of the present application also has the advantages of low cost, simple operation and easy realization, and is suitable for industrial application in a large scale.

Specifically, in an embodiment of the present application, a silicate leaching solution extracted from fly ash is used as a raw material for synthesizing a calcium silicate hydrate by a solution precipitation method. The method has the advantages of wide sources of raw materials and low cost, and the resource cost of the fly ash can be reduced. In addition, in an embodiment of the present application, the preparation process is simple and easy to operate, and the potential of industrial application and popularization in a large scale is achieved. Moreover, as a template agent is not required to add in a synthesis process of the porous calcium silicate hydrate prepared, the preparation cost of the porous calcium silicate hydrate can be further reduced. On the above basis, the porous calcium silicate hydrate prepared by the above preparation method in an embodiment of the present application has more excellent structural features, including a specific surface area of equal to or greater than 400 m2/g, a pore volume of equal to or greater than 2.7 cm3/g, and a pore size concentrated in the range of 20-40 nm. Due to such excellent structural features, the porous calcium silicate hydrate has become a better support for preparation of an adsorbent (such as a solid amine adsorbent), and has a wide application prospect in the field of environmental governance such as preparation of an adsorbent modified by an amine group to absorb $CO_2$ and/or heavy metals.

BRIEF DESCRIPTION OF THE DRAWINGS

In order to more clearly illustrate technical solutions in embodiments of the present application, drawings required for use in the embodiments are briefly introduced below. Obviously, the drawings described below are merely some embodiments of the present application, and other drawings can be obtained by persons of ordinary skill in the field according to these drawings without any creative effort.

DESCRIPTION OF EMBODIMENTS

The technical solutions in the embodiments of the present application are clearly and completely described below in conjunction with the drawings attached to the embodiments of the present application. Obviously, the embodiments described are merely a part, rather than all of the embodiments of the present application. On the basis of the embodiments in the present application, all other embodiments obtained by persons of ordinary skill in the field without any creative effort shall fall within the protection scope of the present application.

In the present application, orientation or position relations indicated by the terms such as "up", "down", "left", "right", "front", "rear", "top", "bottom", "inside", "outside", "middle", "vertical", "horizontal", "transverse" and "longitudinal" are orientation or position relations as shown in the attached drawings. These terms are intended mainly to better describe the present application and the embodiments thereof, and are not intended to limit that devices, elements or components indicated must have a specific orientation or be constructed and operated in a specific orientation.

In addition, some of the terms mentioned above may also be used for expressing other meanings besides the orientation or position relations. For example, the term "up" may also be used for expressing an attachment relation or a connection relation in some cases. Specific meanings of these terms in the present application may be understood by persons of ordinary skill in the field according to specific cases.

Moreover, the terms "install", "set", "provide", "connection" and "connected" should be understood broadly. For example, fixed connection, detachable connection, or monolithic construction may be indicated; mechanical connection or electrical connection may be indicated; and directly connected may be indicated, indirectly connected through an intermediate medium may be indicated, or internal communication between two devices, elements or components may be indicated. Specific meanings of the terms above in the present application may be understood by persons of ordinary skill in the field according to specific cases.

In addition, the terms "first", "second" and the like are intended mainly to distinguish different devices, elements or components (the specific type and construction may be the same or different), and are not intended to indicate or imply the relative importance or quantity of indicated devices, elements or components. Unless otherwise specified, the term "a plurality of" indicates two or more.

The technical solutions of the present application are further explained below in conjunction with specific embodiments and attached drawings.

A calcium silicate hydrate is a porous material that can be applied in different fields, and is mainly synthesized with the use of a template agent in related technologies, because the template agent can be used for adjusting a pore structure of the calcium silicate hydrate, so as to optimize properties of the calcium silicate hydrate. However, as the template agent has high price, the cost of the calcium silicate hydrate prepared is too high, which is unfavorable to industrial application in a large scale. In addition, the inventor has found in a studying process that although the template agent can be used for adjusting the pore structure of the calcium silicate hydrate, the adjustment range is limited, and a large pore volume of greater than 2.0 cm$^3$/g is difficult to achieve, so that the application range of the calcium silicate hydrate prepared is limited. However, when a calcium silicate hydrate is synthesized by a chemical precipitation method, the calcium silicate hydrate synthesized is likely to agglomerate, so that a loose porous calcium silicate hydrate structure is also difficult to obtain. It can be seen that a loose porous calcium silicate hydrate is difficult to obtain without the use of a template agent. However, even when a template agent is used, the pore structure of the calcium silicate hydrate is difficult to further optimize, so that properties of the calcium silicate hydrate are limited.

Based on the above analysis, an embodiment of the present application provides a porous calcium silicate hydrate, a preparation method thereof and an adsorbent. The calcium silicate hydrate with a more optimized pore structure is prepared at lower cost without the use of a template agent, and the calcium silicate hydrate has better adsorption properties when used as an adsorbent.

In a first aspect, an embodiment of the present application provides a preparation method of a porous calcium silicate hydrate. The preparation method includes the following steps:

leaching: leaching fly ash with an alkali agent to obtain a silicate leaching solution;

reaction: adding the silicate leaching solution dropwise to a calcium hydroxide suspension at a constant rate, and conducting stirring and a heating reaction to obtain a calcium silicate hydrate gel; and pore expanding: mixing the calcium silicate hydrate gel with an organic alcohol solvent, conducting azeotropic distillation, and then conducting separation, drying and calcination to obtain the porous calcium silicate hydrate.

According to the preparation method provided in an embodiment of the present application, a porous calcium silicate hydrate with larger pore volume and a better pore structure can be obtained without the use of a template agent, so that the porous calcium silicate hydrate has excellent adsorption properties when used in an adsorbent. Moreover, the preparation method in an embodiment of the present application also has the advantages of low cost, simple operation and easy realization, and is suitable for industrial application in a large scale.

First, according to the preparation method in an embodiment of the present application, the silicate leaching solution is added dropwise to the calcium hydroxide suspension at a constant rate without the use of any template agent, so that the two substances undergo a reaction at a reasonable rate to produce the calcium silicate hydrate gel, and it is ensured that the calcium silicate hydrate has more regular particles. Next, an azeotropic distillation method is used to avoid the problem of collapse of the pore structure in a dewatering process of the calcium silicate hydrate gel, so as to maintain larger pore volume and pore size, and obtain a calcium silicate hydrate with a better structure. Then, on the above basis, the calcium silicate hydrate is further subjected to calcination after azeotropic distillation, separation and drying. After a lot of experimental tests, the inventor has found that the porous calcium silicate hydrate prepared by the above method not only has a better pore structure than a calcium silicate hydrate prepared by using a template agent, but also can further improve adsorption properties when the porous calcium silicate hydrate is used in an adsorbent.

Second, the fly ash is used as a silicon source for preparing the porous calcium silicate hydrate in an embodiment of the present application, and the fly ash is subjected to leaching with an alkali agent to obtain sodium silicate as the silicon source. Not only are the advantages of wide sources of raw materials and low cost achieved, but also the fly ash as a solid waste can be recycled with high value, so that resource recycling of the fly ash has an industrial application and popularization prospect.

It should be noted that although a calcium silicate hydrate can be prepared by a chemical precipitation method in related technologies, the calcium silicate hydrate prepared usually does not have large pore volume and large pore size. Because the calcium silicate hydrate is likely to agglomerate in a reaction process by using the chemical precipitation method, even when the agglomeration degree is controlled by stirring, pore collapse and other phenomena of the calcium silicate hydrate obtained after subsequent drying will also occur, so that a calcium silicate hydrate with large volume and large pore size is difficult to obtain. Therefore, when a porous calcium silicate hydrate with large pore volume is prepared by related technologies, a template agent and a pore expanding agent are usually used by persons skilled in the field to achieve the above purpose. However, as the template agent has high price, the cost of the calcium silicate hydrate prepared is too high, which is unfavorable to industrial application in a large scale. In addition, the inventor has found in a studying process that although the template agent can be used for adjusting the pore structure of the calcium silicate hydrate, the adjustment range is limited, and a large pore volume of greater than 2.0 $cm^3/g$ is difficult to achieve, so that the application range of the calcium silicate hydrate prepared is limited.

However, according to the above preparation method in an embodiment of the present application, the limitation that the pore volume of a sodium silicate hydrate cannot exceed 2.0 $cm^3/g$ when a template agent is used is exactly broken through. In the preparation method in an embodiment of the present application, by adding the sodium silicate dropwise to the calcium hydroxide suspension at constant rate for a precipitation reaction and conducting azeotropic distillation, the porous calcium silicate hydrate finally obtained has a specific surface area of equal to or greater than 400 m2/g, a pore volume of equal to or greater than 2.7 $cm^3/g$, and a pore size concentrated in the range of 20-40 nm, and has a better pore structure than a sodium silicate hydrate prepared with the use of a template agent.

Further, in the step of leaching, the alkali agent is a sodium hydroxide aqueous solution, the sodium hydroxide aqueous solution and the fly ash are mixed and heated to undergo a hydrothermal reaction, followed by filtration and separation to obtain the silicate leaching solution and desilicified fly ash, the silicate leaching solution is a sodium silicate leaching solution, and the desilicified fly ash is used for recycling alumina.

In an embodiment of the present application, the fly ash is subjected to leaching with sodium hydroxide, and after the two substances undergo a hydrothermal reaction, filtration and separation are conducted, so that silicon in the fly ash is leached to the leaching solution in the form of sodium silicate, and the remaining solid is desilicified fly ash obtained after desilicification. This part of desilicified fly ash mainly contains alumina, which can be used for recycling alumina. It can be seen that when the fly ash is used as a silicon source in an embodiment of the present application, silicon and aluminum can be effectively separated to realize collaborative recovery of silicon and aluminum.

It can be understood that a potassium hydroxide aqueous solution or other alkali agents may also be used as the alkali agent in an embodiment of the present application.

Further, in the step of leaching, the alkali agent is a sodium hydroxide aqueous solution, the mass ratio of sodium hydroxide in the sodium hydroxide aqueous solution to the fly ash is 0.4:1 to 0.8:1, the sodium hydroxide aqueous solution has a concentration of 10-30 wt %, and the hydrothermal reaction is carried out at 105-115° C. for 0.4-0.6 h.

The mass ratio of sodium hydroxide in the sodium hydroxide aqueous solution to the fly ash is 0.4:1 to 0.8:1, including any point value in the mass ratio range. For example, the mass ratio of sodium hydroxide in the sodium hydroxide aqueous solution to the fly ash is 0.4:1, 0.5:1, 0.6:1, 0.7:1, or 0.8:1. The sodium hydroxide aqueous solution has a concentration of 10-30 wt %, including any point value in the mass concentration range. For example, the sodium hydroxide aqueous solution has a concentration of 10 wt %, 15 wt %, 20 wt %, 25 wt %, or 30 wt %. The hydrothermal reaction is carried out at 105-115° C., including any point value in the reaction temperature range. For example, the hydrothermal reaction is carried out at 105° C., 108° C., 110° C., 112° C., or 115° C. The reaction time is 0.4-0.6 h, including any point value in the reaction time range. For example, the reaction time is 0.4 h, 0.5 h, or 0.6 h.

Based on the mass ratio of sodium hydroxide to the fly ash, the concentration (namely, the mass percentage of sodium hydroxide in the aqueous solution) of the sodium hydroxide aqueous solution and the corresponding hydrothermal reaction temperature and time, silicon in the fly ash can be better leached by the sodium hydroxide alkali agent, so that silicon and aluminum in the fly ash can be separated more effectively. Not only can a porous calcium silicate hydrate be prepared by using the generated sodium silicate, but also the desilicified fly ash can be used for recycling alumina.

Further, the alkali agent is a sodium hydroxide aqueous solution; and in the step of reaction, stirring and a heating reaction are conducted, followed by filtration to obtain the calcium silicate hydrate gel and a sodium hydroxide byproduct, and the sodium hydroxide byproduct is used for recycling as the alkali agent. In the preparation method in an embodiment of the present application, the alkali agent used for extracting silicon from the fly ash is a sodium hydroxide aqueous solution, and the silicate leaching solution obtained after extraction is a sodium silicate leaching solution. In the step of reaction, the sodium silicate leaching solution and the calcium hydroxide suspension undergo a precipitation reaction to produce the calcium silicate hydrate gel and a sodium hydroxide byproduct. The sodium hydroxide byproduct can be recycled as the alkali agent for leaching the fly ash, so that costs of resource utilization of the fly ash and preparation of the porous calcium silicate hydrate are further reduced.

Further, in the step of reaction, the molar ratio of a silicate in the silicate leaching solution to calcium hydroxide in the calcium hydroxide suspension is 0.9:1 to 1.1:1, and the silicate leaching solution has a concentration of 0.067-1.067 mol/L. The concentration of the silicate leaching solution above is conducive to the growth of calcium silicate hydrate particles, so as to obtain a calcium silicate hydrate with suitable pore size and more regular particles.

The molar ratio of a silicate in the silicate leaching solution to calcium hydroxide in the calcium hydroxide suspension is 0.9:1 to 1.1:1, including any point value in the molar ratio range. For example, the molar ratio of a silicate to calcium hydroxide is 0.9:1, 1:1, or 1.1:1. The silicate leaching solution has concentration of 0.067-1.067 mol/L, including any point value in the concentration range. For example, the silicate leaching solution has a concentration of 0.067 mol/L, 0.08 mol/L, 0.1 mol/L, 0.2 mol/L, 0.5 mol/L, 0.8 mol/L, 1 mol/L, or 1.067 mol/L.

Further, in the step of reaction, the silicate leaching solution is added dropwise to the calcium hydroxide suspension at a constant dropping rate of 15-35 mL/h, the stirring is conducted at a rate of 450-550 rpm, and the heating reaction is conducted at a temperature of 25-80° C. for 2-12 h.

In an embodiment of the present application, the silicate leaching solution is added dropwise to the calcium hydroxide suspension at a constant dropping rate of 15-35 mL/h, and the stirring is conducted on the above reaction system at a rate of 450-550 rpm in the process of a precipitation reaction of the silicate and the calcium hydroxide, so that agglomeration of the calcium hydrate silicate prepared can be effectively prevented, and a good calcium silicate hydrate gel structure is provided for subsequent preparation of a porous calcium silicate hydrate with large pore volume and large pore size.

The dropping rate of the silicate leaching solution is 15-35 mL/h, including any point value in the dropping rate range. For example, the dropping rate of the silicate leaching solution is 15 mL/h, 18 mL/h, 20 mL/h, 25 mL/h, 30 mL/h, or 35 mL/h. The stirring is conducted at a rate of 450-550 rpm, including any point value in the rate range. For example, the stirring is conducted at a rate of 450 rpm, 480 rpm, 500 rpm, 520 rpm, or 550 rpm. The temperature of the heating reaction is 25-80° C., including any point value in the temperature range. For example, the temperature of the heating reaction is 25° C., 35° C., 45° C., 55° C., 65° C., or 80° C. The time of the heating reaction is 2-12 h, including any point value in the reaction time range. For example, the time of the heating reaction is 2 h, 5 h, 8 h, 10 h, or 12 h.

Further, in the step of pore expanding, the organic alcohol solvent is at least one of ethanol, propanol or butanol, and the ratio of the mass of the calcium silicate hydrate gel to the volume of the organic alcohol solvent is 0.9 g: 15 mL to 1.1 g: 15 mL.

When at least one of the ethanol, propanol or butanol is used the organic alcohol solvent for azeotropic distillation of the calcium silicate hydrate gel, since the surface tension of these alcohols is smaller than that of water, the problem of pore collapse of the calcium silicate hydrate will not be caused in the process of taking water away by the organic alcohol solvent. After a lot of experimental tests, the inventor has found that when the butanol is used as the organic alcohol solvent, not only will the problem of pore collapse of the calcium silicate hydrate not be caused, but also the volume of the calcium silicate hydrate can be further increased, so that the porous calcium silicate hydrate finally obtained has a better pore structure.

The ratio of the mass of the calcium silicate hydrate gel to the volume of the organic alcohol solvent is 0.9 g: 15 mL to 1.1 g: 15 mL, including any point value in the ratio range. For example, the ratio of the mass of the calcium silicate hydrate gel to the volume of the organic alcohol solvent is 0.9 g: 15 mL, 1 g: 15 mL, or 1.1 g: 15 ml.

Further, in the step of pore expanding, the azeotropic distillation includes heating the calcium silicate hydrate gel and the organic alcohol solvent to a first temperature first, followed by distillation at constant temperature for 15-25 min, and then heating the same to a second temperature, followed by distillation at constant temperature for 35-45 min, where the first temperature is a boiling point temperature of a system formed by the organic alcohol solvent and water, and the second temperature is a boiling point temperature of the organic alcohol solvent;

and the drying is conducted at 80-85° C. for 10-14 h, and the calcination is conducted at 400-600° C. for 4-4.5 h.

In an embodiment of the present application, the water and the organic alcohol solvent can be more completely removed by the distillation at two different temperatures as described above. On the above basis, a small amount of the residual organic alcohol solvent can be further removed at a low drying temperature of 80-85° C. In this case, the purpose of drying can be achieved without high temperature drying conditions, and damage caused to the pore structure of the calcium silicate hydrate under high temperature drying conditions is avoided. In addition, although a porous calcium silicate hydrate structure can be obtained after drying at low temperature, the inventor has found through experimental tests that when calcination is conducted after drying, especially when calcination is conducted at 400-600° C. for 4-4.5 h, not only is the pore structure of the porous calcium silicate hydrate not affected, but also related adsorption properties of an adsorbent which is obtained by loading an organic amine active component on the calcium silicate hydrate as a support can be improved instead.

When the heating is conducted to reach the first temperature, the distillation at constant temperature is conducted for 15-25 min, including any point value in the time range. For example, the distillation at constant temperature is conducted for 15 min, 18 min, 20 min, 22 min, or 25 min. When the heating is conducted to reach the second temperature, the distillation at constant temperature is conducted for 35-45 min, including any point value in the time range. For example, the distillation at constant temperature is conducted for 35 min, 38 min, 40 min, 42 min, or 45 min. The drying is conducted at a temperature of 80-85° C., including any point value in the drying temperature range. For example, the drying is conducted at a temperature of 80° C., 82° C., or 85° C. The drying is conducted for 10-14 h, including any point value in the time range. For example, the drying is conducted for 10 h, 11 h, 12 h, 13 h, or 14 h. The calcination is conducted at a temperature of 400-600° C., including any point value in the calcination temperature range. For example, the calcination is conducted at a temperature of 400° C., 450° C., 500° C., 550° C., or 600° C. The calcination is conducted for 4-4.5 h, including any point value in the time range. For example, the calcination is conducted for 4 h, 4.2 h, or 4.5 h.

In a second aspect, an embodiment of the present application further provides a porous calcium silicate hydrate. The porous calcium silicate hydrate is prepared by the preparation method as described in the first aspect.

Further, the porous calcium silicate hydrate has a specific surface area of equal to or greater than 400 m2/g, a pore volume of equal to or greater than 2.7 $cm^3/g$, and a pore size of 20-40 nm.

In the field, the pore volume of a porous calcium silicate hydrate prepared is difficult to exceed 2.0 $cm^3/g$ even when a template agent is used. However, the porous calcium silicate hydrate in an embodiment of the present application can still has larger pore volume (equal to or greater than 2.7 $cm^3/g$), larger specific surface area and large pore size when a template agent is not used. As a result, an adsorbent can be promoted to have better adsorption properties when the multi-purpose calcium silicate hydrate is used in the field of adsorbents.

In a third aspect, an embodiment of the present application further provides an adsorbent. The adsorbent includes a support and an organic amine active component loaded on the support. The support is a porous calcium silicate hydrate prepared by the preparation method as described in the first aspect. The adsorbent is used for capturing carbon dioxide and/or adsorbing heavy metals in wastewater.

In the field of catalysts for capturing carbon dioxide and/or adsorbing heavy metals in wastewater, silica and other structures with large pore volume are usually used as a catalyst support in the field. However, common calcium silicate hydrates do not have the above excellent pore structure as a catalyst support. Therefore, a calcium silicate hydrate is usually not used a catalyst support in the above field by persons skilled in the field. However, in an embodiment of the present application, a porous calcium silicate hydrate with larger pore volume can be obtained through improvement of a preparation method, so that the calcium hydrate silicate has an excellent pore structure as a catalyst support, and thus can be used as a support for loading an organic amine active component to prepare an adsorbent.

The porous calcium silicate hydrate prepared in an embodiment of the present application has an excellent pore structure, including a specific surface area of equal to or greater than 400 m2/g, a pore volume of equal to or greater than 2.7 cm3/g, and a pore size of 20-40 nm, and especially the pore volume is much larger than the level of prior art. Therefore, under the condition of the same amount of a support, the porous calcium silicate hydrate as a support can effectively load more organic amine active components, and accordingly, an adsorbent formed by the two substances has better adsorption capacity and adsorption rate.

The technical solutions of the present application are further explained and illustrated in combination with more specific embodiments and experimental test results.

Example 1

Figure 1:
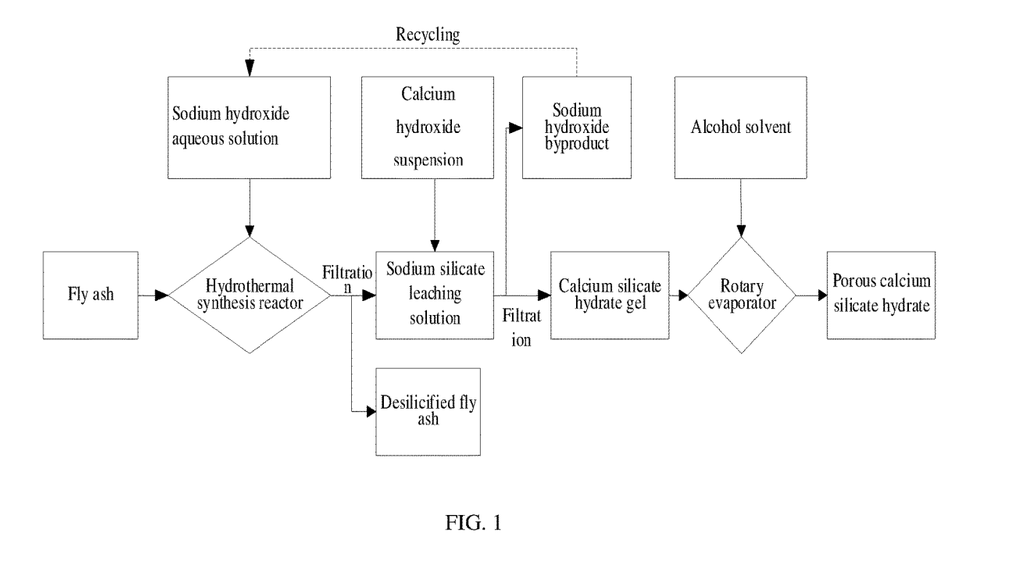
FIG. 1 is a process flow diagram showing preparation of a porous calcium silicate hydrate in Example 1.

This example provides a porous calcium silicate hydrate, and FIG. 1 is a process flow diagram showing a preparation method of the porous calcium silicate hydrate. The preparation method of the porous calcium silicate hydrate includes the following steps:

leaching: leaching fly ash with a sodium hydroxide aqueous solution, subjecting the two substances to mixing and heating for a hydrothermal reaction in a hydrothermal synthesis reactor at 110° C. for 0.5 h, and then conducting filtration and separation to obtain a sodium silicate leaching solution and desilicified fly ash, where the desilicified fly ash is used for recycling alumina, the sodium hydroxide aqueous solution includes 8 g of sodium hydroxide and 72 mL of ultra-pure water, and 20 g of the fly ash is used;

reaction: adding 75 mL of the sodium silicate leaching solution with a concentration of 0.267 mol/L dropwise to 125 mL of a calcium hydroxide suspension with a concentration of 0.16 mol/L at a constant dropping rate of 35 mL/h, conducting stirring at a rate of 500 rpm for a complete reaction at 25° C. for 12 h, and then conducting filtration and separation to obtain a calcium silicate hydrate gel and a sodium hydroxide byproduct, where the sodium hydroxide byproduct is used for recycling as an alkali agent for leaching the fly ash in the step of leaching as described above, the calcium-silicon ratio of the calcium silicate hydrate gel is 1, the calcium-silicon ratio refers to the molar ratio of calcium to silicon, and a reaction equation of the sodium silicate leaching solution and the calcium hydroxide suspension is as follows: $Na_2SiO_3 + Ca(OH)_2 \rightarrow CaSiO_3\downarrow + 2NaOH$; and pore expanding: mixing the calcium silicate hydrate gel prepared in the step of reaction with 30 mL of ethanol; conducting heating to 78.2° C. first in a rotary evaporator, followed by distillation at constant temperature for 20 min to remove the water; then conducting heating to 79° C., followed by distillation at constant temperature for 40 min to remove the ethanol; and subjecting a mixture obtained after azeotropic distillation to centrifugation, drying at 80° C. for 12 h and calcination at 400° C. for 4 h to obtain the porous calcium silicate hydrate.

Example 2

This example provides a porous calcium silicate hydrate. A preparation method of the porous calcium silicate hydrate includes the following steps:

leaching: leaching fly ash with a sodium hydroxide aqueous solution, subjecting the two substances to mixing and heating for a hydrothermal reaction in a hydrothermal synthesis reactor at 110° C. for 0.5 h, and then conducting filtration and separation to obtain a sodium silicate leaching solution and desilicified fly ash, where the desilicified fly ash is used for recycling alumina, the sodium hydroxide aqueous solution includes 10 g of sodium hydroxide and 40 mL of ultra-pure water, and 20 g of the fly ash is used;

reaction: adding 75 mL of the sodium silicate leaching solution with a concentration of 0.133 mol/L dropwise to 125 mL of a calcium hydroxide suspension with a concentration of 0.08 mol/L at a constant dropping rate of 30 mL/h, conducting stirring at a rate of 500 rpm for a complete reaction at 40° C. for 10 h, and then conducting filtration and separation to obtain a calcium silicate hydrate gel and a sodium hydroxide byproduct, where the sodium hydroxide byproduct is used for recycling as an alkali agent for leaching the fly ash in the step of leaching as described above, the calcium-silicon ratio of the calcium silicate hydrate gel is 1, and the calcium-silicon ratio refers to the molar ratio of calcium to silicon; and pore expanding: mixing the calcium silicate hydrate gel prepared in the step of reaction with 90 mL of n-propanol; conducting heating to 88° C. first in a rotary evaporator, followed by distillation at constant temperature for 20 min to remove the water; then conducting heating to 96° C., followed by distillation at constant temperature for 40 min to remove the n-propanol; and subjecting a mixture obtained after azeotropic distillation to centrifugation, drying at 80° C. for 12 h and calcination at 600° C. for 4 h to obtain the porous calcium silicate hydrate.

Example 3

This example provides a porous calcium silicate hydrate. A preparation method of the porous calcium silicate hydrate includes the following steps:

leaching: leaching fly ash with a sodium hydroxide aqueous solution, subjecting the two substances to mixing and heating for a hydrothermal reaction in a hydrothermal synthesis reactor at 110° C. for 0.5 h, and then conducting filtration and separation to obtain a sodium silicate leaching solution and desilicified fly ash, where the desilicified fly ash is used for recycling alumina, the sodium hydroxide aqueous solution includes 10 g of sodium hydroxide and 30 mL of ultra-pure water, and 20 g of the fly ash is used;

reaction: adding 75 mL of the sodium silicate leaching solution with a concentration of 0.267 mol/L dropwise to 125 mL of a calcium hydroxide suspension with a concentration of 0.16 mol/L at a constant dropping rate of 25 mL/h, conducting stirring at a rate of 500 rpm for a complete reaction at 80° C. for 8 h, and then conducting filtration and separation to obtain a calcium silicate hydrate gel and a sodium hydroxide byproduct, where the sodium hydroxide byproduct is used for recycling as an alkali agent for leaching the fly ash in the step of leaching as described above, the calcium-silicon ratio of the calcium silicate hydrate gel is 1, and the calcium-silicon ratio refers to the molar ratio of calcium to silicon; and pore expanding: mixing the calcium silicate hydrate gel prepared in the step of reaction with 90 mL of n-butanol; conducting heating to 93° C. first in a rotary evaporator, followed by distillation at constant temperature for 20 min to remove the water; then conducting heating to 117° C., followed by distillation at constant temperature for 40 min to remove the n-butanol; and subjecting a mixture obtained after azeotropic distillation to centrifugation, drying at 80° C. for 12 h and calcination at 500° C. for 4 h to obtain the porous calcium silicate hydrate.

Example 4

This example provides a porous calcium silicate hydrate. A preparation method of the porous calcium silicate hydrate includes the following steps:

leaching: leaching fly ash with a sodium hydroxide aqueous solution, subjecting the two substances to mixing and heating for a hydrothermal reaction in a hydrothermal synthesis reactor at 110° C. for 0.5 h, and then conducting filtration and separation to obtain a sodium silicate leaching solution and desilicified fly ash, where the desilicified fly ash is used for recycling alumina, the sodium hydroxide aqueous solution includes 12 g of sodium hydroxide and 28 mL of ultra-pure water, and 20 g of the fly ash is used;

reaction: adding 75 mL of the sodium silicate leaching solution with a concentration of 0.533 mol/L dropwise to 125 mL of a calcium hydroxide suspension with a concentration of 0.32 mol/L at a constant dropping rate of 20 mL/h, conducting stirring at a rate of 500 rpm for a complete reaction at 60° C. for 6 h, and then conducting filtration and separation to obtain a calcium silicate hydrate gel and a sodium hydroxide byproduct, where the sodium hydroxide byproduct is used for recycling as an alkali agent for leaching the fly ash in the step of leaching as described above, the calcium-silicon ratio of the calcium silicate hydrate gel is 1, and the calcium-silicon ratio refers to the molar ratio of calcium to silicon; and pore expanding: mixing the calcium silicate hydrate gel prepared in the step of reaction with 90 mL of tert-butanol; conducting heating to 80° C. first in a rotary evaporator, followed by distillation at constant temperature for 20 min to remove the water; then conducting heating to 85° C., followed by distillation at constant temperature for 40 min to remove the tert-butanol; and subjecting a mixture obtained after azeotropic distillation to centrifugation, drying at 80° C. for 12 h and calcination at 400° C. for 4 h to obtain the porous calcium silicate hydrate.

Example 5

This example provides a porous calcium silicate hydrate. A preparation method of the porous calcium silicate hydrate includes the following steps:

leaching: leaching fly ash with a sodium hydroxide aqueous solution, subjecting the two substances to mixing and heating for a hydrothermal reaction in a hydrothermal synthesis reactor at 110° C. for 0.5 h, and then conducting filtration and separation to obtain a sodium silicate leaching solution and desilicified fly ash, where the desilicified fly ash is used for recycling alumina, the sodium hydroxide aqueous solution includes 14 g of sodium hydroxide and 40 mL of ultra-pure water, and 20 g of the fly ash is used;

reaction: adding 75 mL of the sodium silicate leaching solution with a concentration of 1.067 mol/L dropwise to 125 mL of a calcium hydroxide suspension with a concentration of 0.64 mol/L at a constant dropping rate of 15 mL/h, conducting stirring at a rate of 500 rpm for a complete reaction at 50° C. for 4 h, and then conducting filtration and separation to obtain a calcium silicate hydrate gel and a sodium hydroxide byproduct, where the sodium hydroxide byproduct is used for recycling as an alkali agent for leaching the fly ash in the step of leaching as described above, the calcium-silicon ratio of the calcium silicate hydrate gel is 1, and the calcium-silicon ratio refers to the molar ratio of calcium to silicon; and pore expanding: mixing the calcium silicate hydrate gel prepared in the step of reaction with 90 mL of n-propanol; conducting heating to 88° C. first in a rotary evaporator, followed by distillation at constant temperature for 20 min to remove the water; then conducting heating to 88° C., followed by distillation at constant temperature for 40 min to remove the n-propanol; and subjecting a mixture obtained after azeotropic distillation to centrifugation, drying at 80°

C. for 12 h and calcination at 600° C. for 4 h to obtain the porous calcium silicate hydrate.

Example 6

This example provides a porous calcium silicate hydrate. A preparation method of the porous calcium silicate hydrate includes the following steps:

leaching: leaching fly ash with a sodium hydroxide aqueous solution, subjecting the two substances to mixing and heating for a hydrothermal reaction in a hydrothermal synthesis reactor at 110° C. for 0.5 h, and then conducting filtration and separation to obtain a sodium silicate leaching solution and desilicified fly ash, where the desilicified fly ash is used for recycling alumina, the sodium hydroxide aqueous solution includes 16 g of sodium hydroxide and 50 mL of ultra-pure water, and 20 g of the fly ash is used;

reaction: adding 75 mL of the sodium silicate leaching solution with a concentration of 0.267 mol/L dropwise to 125 mL of a calcium hydroxide suspension with a concentration of 0.16 mol/L at a constant dropping rate of 25 mL/h, conducting stirring at a rate of 500 rpm for a complete reaction at 70° C. for 2 h, and then conducting filtration and separation to obtain a calcium silicate hydrate gel and a sodium hydroxide byproduct, where the sodium hydroxide byproduct is used for recycling as an alkali agent for leaching the fly ash in the step of leaching as described above, the calcium-silicon ratio of the calcium silicate hydrate gel is 1, and the calcium-silicon ratio refers to the molar ratio of calcium to silicon; and pore expanding: mixing the calcium silicate hydrate gel prepared in the step of reaction with 90 mL of n-butanol; conducting heating to 93° C. first in a rotary evaporator, followed by distillation at constant temperature for 20 min to remove the water; then conducting heating to 117° C., followed by distillation at constant temperature for 40 min to remove the n-butanol; and subjecting a mixture obtained after azeotropic distillation to centrifugation, drying at 80° C. for 12 h and calcination at 500° C. for 4 h to obtain the porous calcium silicate hydrate.

Comparative Example

This comparative example provides a porous calcium silicate hydrate. The difference between the comparative example and Example 3 is only that in the step of pore expanding in a preparation method in the comparative example, only centrifugation and drying are conducted after azeotropic distillation, and calcination is not conducted.

Application Example

Figure 2:
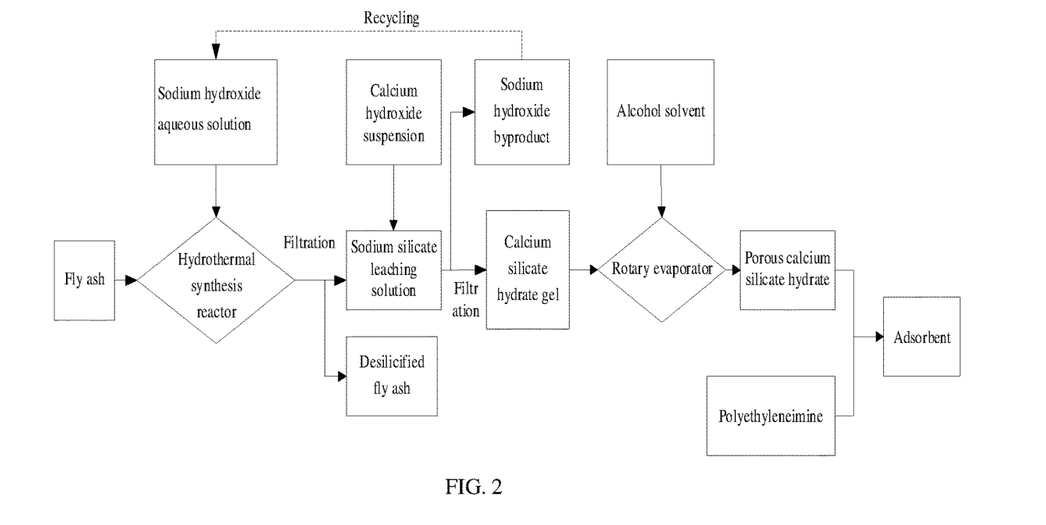
FIG. 2 is a process flow diagram showing preparation of an adsorbent in an application example.

This application example provides an adsorbent. The adsorbent includes a support and an organic amine active component loaded on the support. The support is the porous calcium silicate hydrate prepared in Example 3, and the organic amine active component is polyethyleneimine Combined with FIG. 2, FIG. 2 is a process flow diagram showing preparation of an adsorbent in the application example. A preparation method of the adsorbent includes the following step: loading the polyethyleneimine on the porous calcium silicate hydrate in Example 3 by an impregnation method to obtain the adsorbent, where the mass percent of the loaded organic amine active component in the adsorbent is 60%.

Comparative Application Example

This comparative application example provides an adsorbent. The difference between the comparative application example and the application example is only that the support used in the comparative application example is the porous calcium silicate hydrate prepared in the comparative example.

Performance Test

Figure 3:
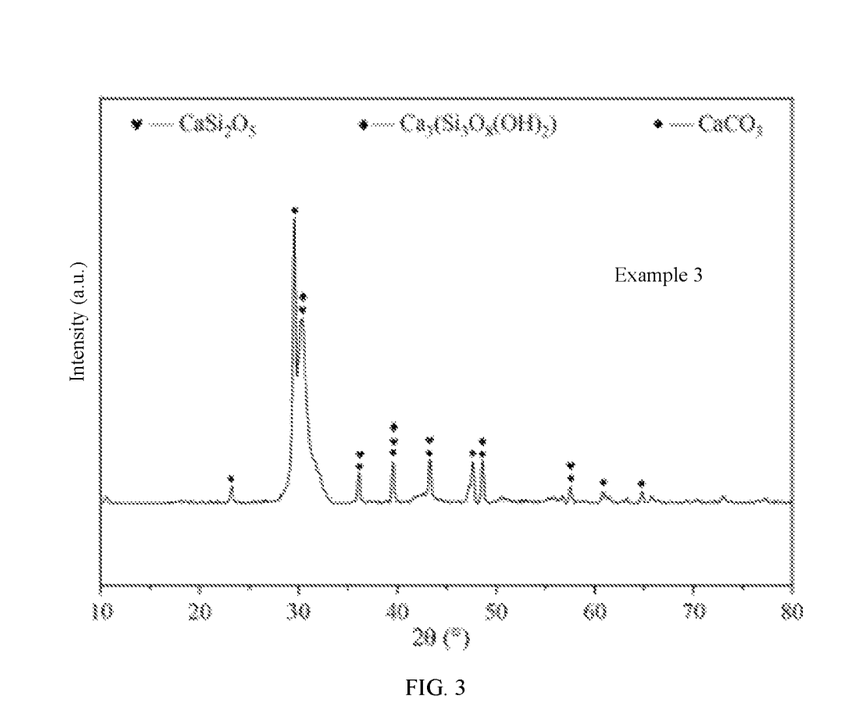
FIG. 3 is an X-ray map of a porous calcium silicate hydrate in Example 3.
Figure 4:
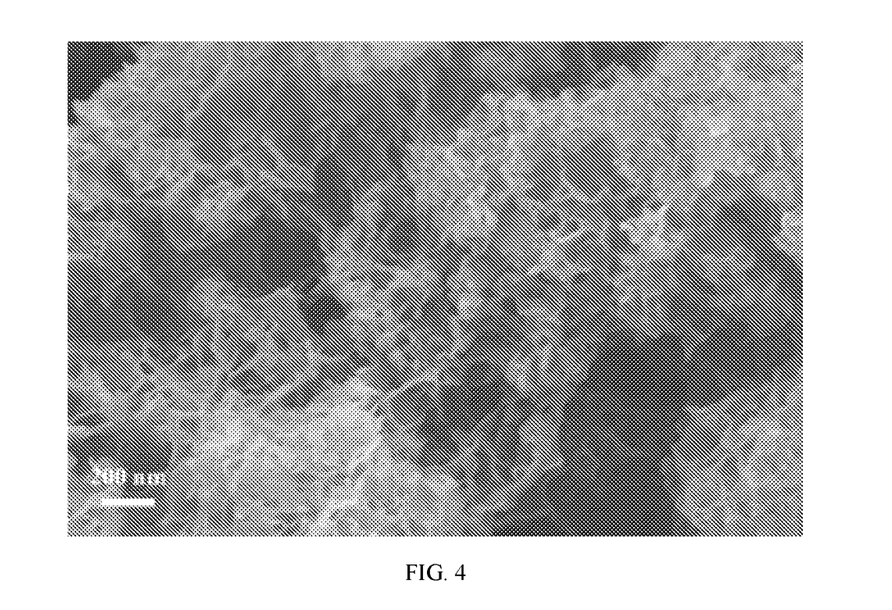
FIG. 4 is a scanning electron microscopy image of the porous calcium silicate hydrate in Example 3.

A series of characterization were carried out on the phase composition and morphology of porous calcium silicate hydrates prepared in embodiments of the present application. FIG. 3 is an X-ray map of a porous calcium silicate hydrate in Example 3. Irradiation conditions include: Cu-Kα as a ray source, a continuous scanning mode, a scanning rate of 5°/min, and 2θ being 10-80°. Results in FIG. 3 show that the porous calcium silicate hydrate mainly consists of three phases including $CaSi_2O_5$, $Ca_3(Si_3O_8(OH)_2)$ and $CaCO_3$. A sample has low crystallinity, and basically belongs to an amorphous form. FIG. 4 is an scanning electron microscopy image of a porous calcium silicate hydrate in Example 3. From FIG. 4, it can be seen that a fibrous laminate structure with a developed pore structure is formed on the surface of the porous calcium silicate hydrate.

Figure 5:
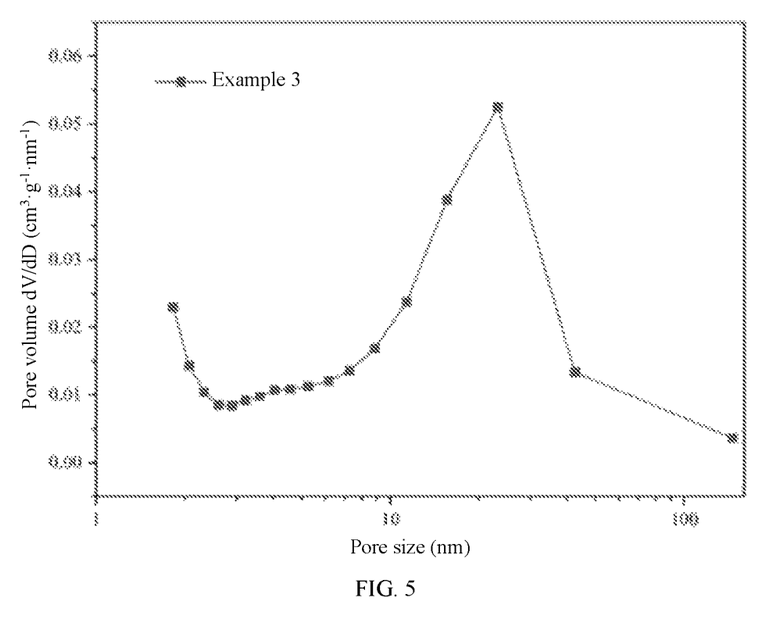
FIG. 5 is a pore size distribution diagram in Example 3.

Structural features of porous calcium silicate hydrates are further analyzed by using a specific surface area and porosity analyzer in embodiments of the present application. Results are as shown in Table 1. From Table 1, it can be seen that the porous calcium silicate hydrate prepared in an embodiment of the present application has a high specific surface area of equal to or greater than 400 m2/g and a large pore volume of equal to or greater than 2.7 cm3/g. In addition, FIG. 5 is a pore size distribution diagram in Example 3. From FIG. 5, it can be seen that the pore size of the porous calcium silicate hydrate is concentrated in the range of 20-40 nm, showing uniform unimodal pore size distribution features.

TABLE 1

| Sample number | Specific surface area $(m^2/g)$ | Average pore size (nm) | Pore volume $(cm^3/g)$ |
|---|---|---|---|
| Example 1 | 492.7 | 23.9 | 2.7 |
| Example 3 | 421.3 | 32.0 | 3.0 |
| Example 4 | 397.5 | 30.5 | 2.7 |
| Comparative Example | 632.07 | 17.44 | 2.84 |

Structural parameters of porous calcium silicate hydrates in embodiments of the present application Through a lot of experimental tests, the inventor has found that the porous calcium silicate hydrate prepared in Example 3 has the best structural features, including a pore volume of 3.0 cm$^3$/g. It can be seen that when the n-butanol is used as an entrainer in azeotropic distillation, more convenience is provided for optimizing the pore structure of the calcium silicate hydrate and increasing the pore volume. Moreover, the inventor has also found in a studying process that in the step of reaction, more convenience is provided for controlling the particle size and pore volume of the calcium silicate hydrate prepared by controlling an appropriate concentration of the sodium silicate leaching solution. When a high concentration of the sodium silicate leaching solution is used, the decrease rate of the pH value can be slowed down, so that calcium silicate hydrate particles produced have more opportunities to grow, resulting in larger calcium silicate hydrate particles and reduced porosity between adjacent particles. When a relatively low concentration of the sodium silicate leaching solution is used, effective collisions in a nucleation process are in shortage, calcium silicate hydrate particles become smaller and more irregular and are more densely packed, resulting in a decrease in pore volume. After a lot of experimental tests in the present application, it has been found that when the concentration of the sodium silicate leaching solution is 0.267 mol/L, more convenience is provided for obtaining a porous calcium silicate hydrate structure with larger pore volume and specific surface area.

Figure 6:
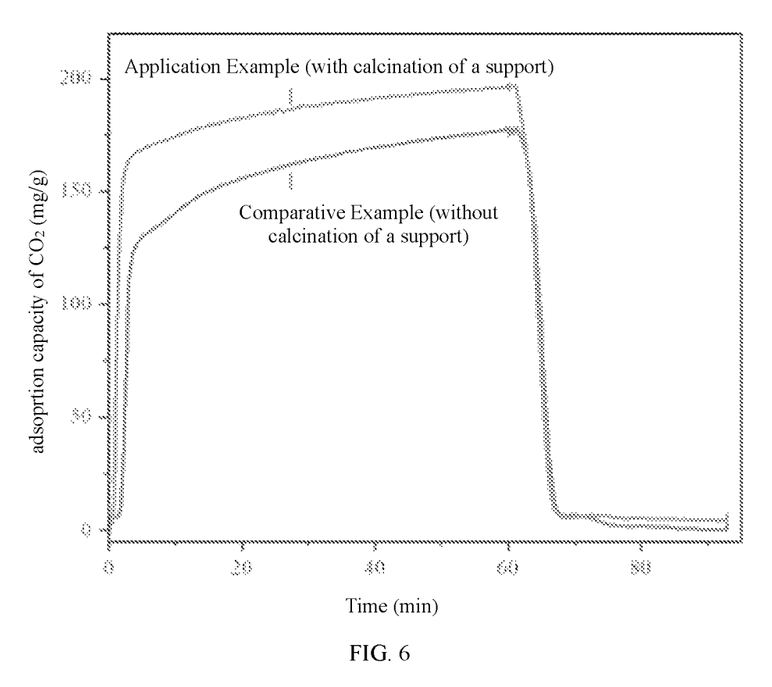
FIG. 6 is a diagram showing results of the adsorption capacity of carbon dioxide adsorbed by adsorbents in an application example and a comparative application example.

Adsorption properties of the adsorbents in the application example and the comparative application example are also tested in the present application. Specifically, the adsorbents in the application example and the comparative application example are used for adsorbing carbon dioxide, and results are as shown in FIG. 6. FIG. 6 is a diagram showing results of the adsorption capacity of carbon dioxide adsorbed by the adsorbents in the application example and the comparative application example. Combined with FIG. 6 and Table 1, it can be seen that the step of calcination in the preparation method of the present application is conducive to further improving the pore volume and pore size of the porous calcium silicate hydrate finally obtained. More importantly, after the calcined porous calcium silicate hydrate is prepared into an adsorbent, the adsorption capacity of carbon dioxide is significantly increased. The adsorption capacity of carbon dioxide adsorbed by the adsorbent in the application example can reach 197 mg/g, while the adsorption capacity of carbon dioxide adsorbed by the adsorbent without calcination of a support in the comparative application example is only 175 mg/g. It can be seen that the step of calcination can break a bridging oxygen bond between calcium silicate molecules to form larger pores, thus playing an important role in increasing the adsorption rate and adsorption capacity of carbon dioxide.

A porous calcium silicate hydrate and a preparation method thereof, an adsorbent and application thereof are introduced in detail in embodiments of the present application as above. The principle and embodiments of the application are illustrated in specific examples herein, and the above embodiments are described only to help understand the technical solutions and core ideas of the present application. Meanwhile, various changes in specific embodiments and application scope will be made by persons of ordinary skill in the field according to the ideas of the present application. In summary, contents in the specification should not be understood as limitations of the present application.

What is claimed is:

1. A preparation method of a porous calcium silicate hydrate, wherein the preparation method comprises the following steps:
   leaching: leaching fly ash with an alkali agent to obtain a silicate leaching solution;
   reaction: adding the silicate leaching solution dropwise to a calcium hydroxide suspension at a constant rate, and conducting stirring and a heating reaction to obtain a calcium silicate hydrate gel, wherein the dropping rate of the silicate leaching solution is 15-35 mL/h, wherein the temperature of the heating reaction is 25-70° C.; and
   pore expanding: mixing the calcium silicate hydrate gel with an organic alcohol solvent, conducting azeotropic distillation, and then conducting separation, drying and calcination to obtain the porous calcium silicate hydrate, wherein the obtained porous calcium silicate hydrate are substantially of an amorphous form.

2. The preparation method according to claim 1, wherein in the step of leaching, the alkali agent is a sodium hydroxide aqueous solution, the sodium hydroxide aqueous solution and the fly ash are mixed and heated to undergo a hydrothermal reaction, followed by filtration and separation to obtain the silicate leaching solution and desilicified fly ash, the silicate leaching solution is a sodium silicate leaching solution, and the desilicified fly ash is used for recycling alumina; and
   in the step of leaching, the mass ratio of sodium hydroxide in the sodium hydroxide aqueous solution to the fly ash is 0.4:1 to 0.8:1, the sodium hydroxide aqueous solution has a concentration of 10-30 wt %, and the hydrothermal reaction is carried out at 105-115° C. for 0.4-0.6 h.

3. The preparation method according to claim 1, wherein the alkali agent is a sodium hydroxide aqueous solution; and in the step of reaction, stirring and a heating reaction are conducted, followed by filtration to obtain the calcium silicate hydrate gel and a sodium hydroxide byproduct, and the sodium hydroxide byproduct is used for recycling as the alkali agent.

4. The preparation method according to claim 1, wherein in the step of reaction, the molar ratio of a silicate in the silicate leaching solution to calcium hydroxide in the calcium hydroxide suspension is 0.9:1 to 1.1:1, and the silicate leaching solution has a concentration of 0.067-1.067 mol/L; and
   the silicate leaching solution is added dropwise to the calcium hydroxide suspension at a constant dropping rate of 15-35 mL/h, the stirring is conducted is a rate of 450-550 rpm, and the heating reaction is conducted at a temperature of 25-70° C. for 2-12 h.

5. The preparation method according to claim 1, wherein in the step of pore expanding, the organic alcohol solvent is at least one of ethanol, propanol or butanol, and the ratio of the mass of the calcium silicate hydrate gel to the volume of the organic alcohol solvent is 0.9 g: 15 mL to 1.1 g: 15 mL.

6. The preparation method according to claim 2, wherein in the step of pore expanding, the organic alcohol solvent is at least one of ethanol, propanol or butanol, and the ratio of the mass of the calcium silicate hydrate gel to the volume of the organic alcohol solvent is 0.9 g: 15 mL to 1.1 g: 15 mL.

7. The preparation method according to claim 3, wherein in the step of pore expanding, the organic alcohol solvent is at least one of ethanol, propanol or butanol, and the ratio of the mass of the calcium silicate hydrate gel to the volume of the organic alcohol solvent is 0.9 g: 15 mL to 1.1 g: 15 mL.

8. The preparation method according to claim 4, wherein in the step of pore expanding, the organic alcohol solvent is at least one of ethanol, propanol or butanol, and the ratio of the mass of the calcium silicate hydrate gel to the volume of the organic alcohol solvent is 0.9 g: 15 mL to 1.1 g: 15 mL.

9. The preparation method according to claim 1, wherein in the step of pore expanding, the azeotropic distillation comprises heating the calcium silicate hydrate gel and the organic alcohol solvent to a first temperature first, followed by distillation at constant temperature for 15-25 min, and then heating the same to a second temperature, followed by distillation at constant temperature for 35-45 min, wherein the first temperature is a boiling point temperature of a system formed by the organic alcohol solvent and water, and the second temperature is a boiling point temperature of the organic alcohol solvent;
   and the drying is conducted at 80-85° C. for 10-14 h, and the calcination is conducted at 400-600° C. for 4-4.5 h.

10. The preparation method according to claim 2, wherein in the step of pore expanding, the azeotropic distillation comprises heating the calcium silicate hydrate gel and the organic alcohol solvent to a first temperature first, followed by distillation at constant temperature for 15-25 min, and then heating the same to a second temperature, followed by distillation at constant temperature for 35-45 min, wherein the first temperature is a boiling point temperature of a system formed by the organic alcohol solvent and water, and the second temperature is a boiling point temperature of the organic alcohol solvent;

and the drying is conducted at 80-85° C. for 10-14 h, and the calcination is conducted at 400-600° C. for 4-4.5 h.

11. The preparation method according to claim 3, wherein in the step of pore expanding, the azeotropic distillation comprises heating the calcium silicate hydrate gel and the organic alcohol solvent to a first temperature first, followed by distillation at constant temperature for 15-25 min, and then heating the same to a second temperature, followed by distillation at constant temperature for 35-45 min, wherein the first temperature is a boiling point temperature of a system formed by the organic alcohol solvent and water, and the second temperature is a boiling point temperature of the organic alcohol solvent;

and the drying is conducted at 80-85° C. for 10-14 h, and the calcination is conducted at 400-600° C. for 4-4.5 h.

12. The preparation method according to claim 4, wherein in the step of pore expanding, the azeotropic distillation comprises heating the calcium silicate hydrate gel and the organic alcohol solvent to a first temperature first, followed by distillation at constant temperature for 15-25 min, and then heating the same to a second temperature, followed by distillation at constant temperature for 35-45 min, wherein the first temperature is a boiling point temperature of a system formed by the organic alcohol solvent and water, and the second temperature is a boiling point temperature of the organic alcohol solvent;

and the drying is conducted at 80-85° C. for 10-14 h, and the calcination is conducted at 400-600° C. for 4-4.5 h.

\* \* \* \* \*